UNITED STATES PATENT OFFICE.

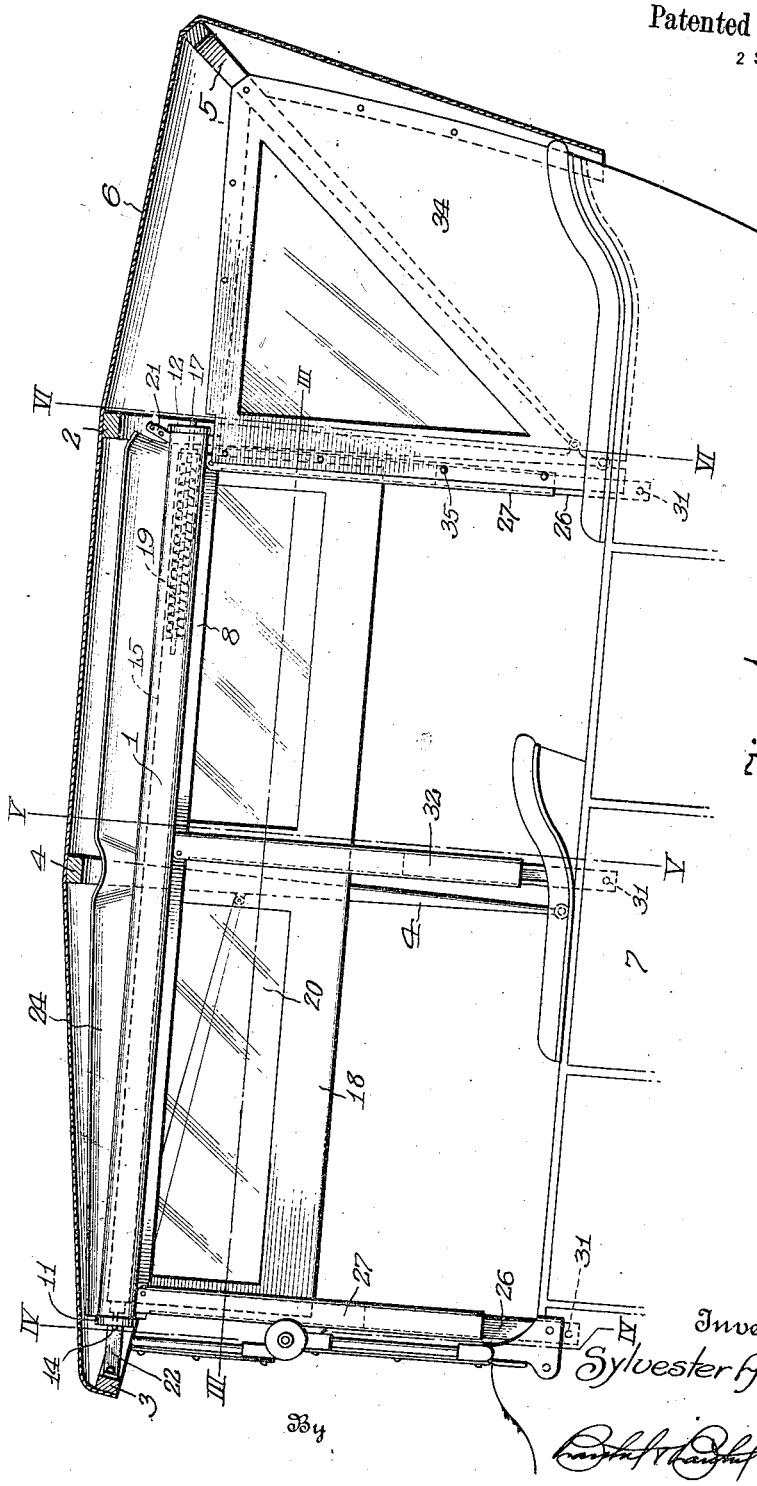

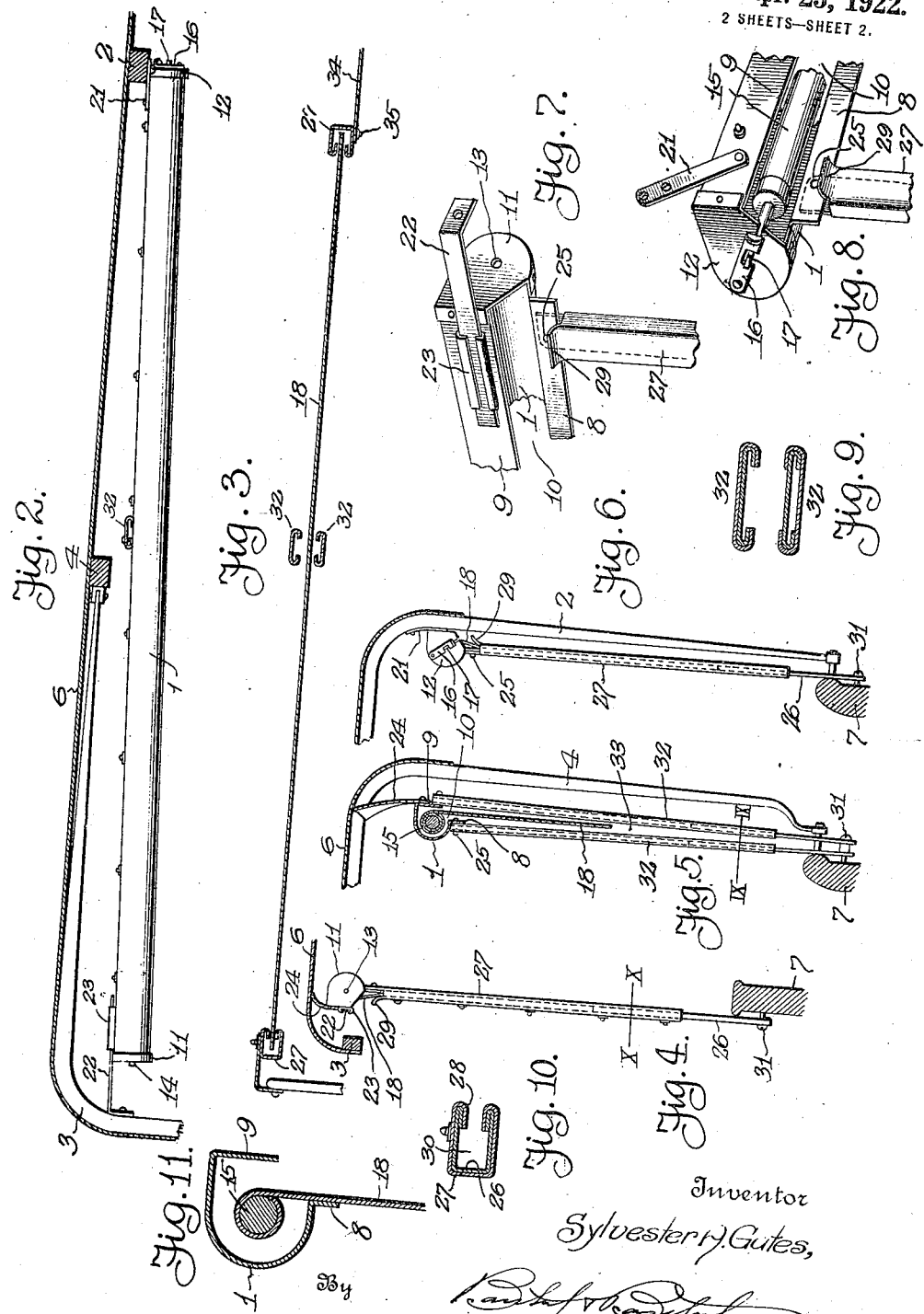

SYLVESTER A. GATES, OF DETROIT, MICHIGAN.

AUTOMOBILE TOP CURTAIN.

1,413,657. Specification of Letters Patent. Patented Apr. 25, 1922.

Application filed January 31, 1920. Serial No. 355,313.

*To all whom it may concern:*

Be it known that I, SYLVESTER A. GATES, a citizen of the United States of America, residing at Detroit, in the county of Wayne and State of Michigan, have invented certain new and useful Improvements in Automobile Top Curtains, of which the following is a specification, reference being had therein to the accompanying drawings.

This invention relates to automobile side curtains that may be advantageously used in connection with a collapsible or foldable automobile top to cooperate therewith, when the top is raised or in an active position, in providing an enclosure for the occupants of the automobile, and the present invention includes numerous improvements by which the side curtains are rendered more practical, easy to handle and install and cheaper to produce.

One of the main improvements is in connection with the front, intermediate and back rails, which are now made telescopic and foldable, so that the side curtains will occupy a comparatively small space when knocked down besides facilitating installment of the side curtains in an automobile. This improvement, as well as others, will hereinafter appear and reference will now be had to the drawings, wherein—

Figure 1 is a longitudinal sectional view of an automobile top, showing the inner side of a side equipment for the top;

Fig. 2 is a plan of one of the side curtains showing the top in horizontal section;

Fig. 3 is a horizontal sectional view taken on the line III—III of Fig. 1;

Fig. 4 is a vertical cross sectional view taken on the line IV—IV of Fig. 1;

Fig. 5 is a similar view taken on the line V—V of Fig. 1;

Fig. 6 is a similar view taken on the line VI—VI of Fig. 1;

Fig. 7 is a perspective view of one of the front adjustable brackets of a side curtain;

Fig. 8 is a similar view showing one of the rear brackets of the side curtains;

Fig. 9 is a horizontal sectional view taken on the line IX—IX of Fig. 5;

Fig. 10 is a similar view taken on the line X—X of Fig. 4, and

Fig. 11 is an enlarged cross sectional view of a modified form of curtain roller housing.

The side curtains, as now constructed, include a metallic housing 1 of sufficient length to extend from a rear vertical automobile bow 2 to a front outrigger bow 3 which is ordinarily supported by a front vertical bow 4 which cooperates with the bow 2 and a rearwardly inclined bow 5 in supporting the usual canopy top 6 for an automobile body 7.

The metallic housing 1 is substantially semi-cylindrical and when made of metal it is provided with a front depending longitudinal flange 8 and a rear depending flange 9, these flanges being disposed in vertical parallel planes with the flange 9 in a plane above the flange 8 and both flanges cooperating in providing a longitudinal bottom slot 10 throughout the length of the housing 1.

Suitably connected to the ends of the housing 1 are caps 11 and 12, best shown in Figs. 7 and 8, the cap 11 having an aperture 13 for the pintle 14 at one end of a curtain shade roller 15, and the cap 12 has a slot and pivoted keeper 16 for the usual winding pintle 17 at the opposite end of the curtain shade roller 15. The curtain shade roller extends throughout the length of the housing 1 and is constructed similar to an ordinary curtain shade roller, that is, it has a rollable curtain 18 which may be conveniently wound on the curtain shade roller 15 through the medium of a spring 19, within the curtain shade roller. The curtain 18 is necessarily of considerable length and is provided with lights or transparent panels 20 with the body of the curtain suitably reinforced so as to possess a desired degree of rigidity to prevent buckling and withstand wind pressure.

The housing 1 is supported by the bows 2 and 3 substantially in parallelism with the side walls of the canopy top and the supporting means for each housing, at each side of the automobile top, includes a rear angularly disposed bracket 21, carried by the flange 9 of the housing 1 and connected to the bow 2 by screws or other fastening means. The front end of the housing 1 is supported by an angle bracket 22 screwed or otherwise connected to the outrigger bow 3, said bracket extending rearwardly into a channel guide 23 carried by the flange 9 of the housing 1. The housing has a sliding engagement with the bracket 22 and it is through the medium of this adjustable bracket that the housing can be mounted in automobile tops even though there may be some irregularities in the longitudinal dimensions of the top or particularly between the rear vertical bow and the outrigger bow.

Riveted or otherwise connected to the flange 9 of the housing 1 is a semi-rigid vertically disposed flap 24 which extends upwardly and engages the canopy top 6, said flap extending throughout the length of the housing and snugly engaging the bows 2 and 4, so as to form a shield which will close the space between the canopy top 6 and the housing 1 and exclude air and the elements. This sealing flap is essential and constantly cooperates with the curtain 18 in closing the side of the automobile top.

Pivotally connected to the flange 8 of the housing, as at 25, are front, intermediate and rear rails that may be swung substantially in parallelism with the flange 8, when the side curtains are removed or not in use, and all of these rails are somewhat similar in construction, particularly the front and rear rails which are identical. Each front or rear rail comprises an inner channel member 26 and an outer channel member 27, said outer channel member having inturned flanges 28 providing guideways to receive the side flanges of the inner channel member 26, so that the outer channel member will telescope the inner channel member and these members may be shifted relative to each other to increase and decrease the longitudinal dimensions of the rails. With the upper end of the outer channel member 27 pivotally connected to the housing flange 8 by one of the side flanges of said outer channel member, the other side flange may be bent outwardly, as at 29, so that the vertical edges of the curtain 18 may readily enter the guide grooves 30 formed by the inner and outer channel members of the rails.

The lower ends of the inner channel members 26 of the front and rear rails are adapted to be fastened, as at 31, to the inner walls of the automobile body 7, as best shown in Figs. 1, 4 and 6, and with the front and rear rails so fixed that the guide grooves 30 of said rails confront each other and receive the vertical edges of the curtain 18. With the curtain 18 raised and the lower ends of the rails released the front and rear rails may be swung upwardly so that the flange 8 of the housing 1 will extend into the grooves 30 and permit of the front and rear rails being closely assembled relative to the curtain shade roller housing 1.

The intermediate rail is composed of two telescopic members 32 providing a guideway 33 therebetween for the middle portion of the curtain 18, and each of the members 32 may be made of telescopic channel sections slidable one within the other with the lowermost sections connected to the inner wall of the automobile body 7 similar to the front and rear rails. With the upper ends of the members 32 pivoted on the outer walls of the flanges 8 and 9, as shown in Fig. 5, the guideway 33 will readily receive the curtain 18 and thus cooperate with the guide grooves 30 of the front and rear rails in preventing lateral displacement of the curtain 18. Furthermore, with the upper ends of the members 32 pivotally connected to the outer walls of the housing flanges it is possible to swing said members upwardly into parallelism with said flanges when the lower ends of said members are released relative to the automobile body.

As shown in Fig. 11, the housing 1 may be proportioned relative to the curtain shade roller 15 so that when the curtain 18 is lowered it will contact with the flange 8 of said housing and seal one end of the space between the unwound curtain shade roller and said housing. It is now apparent that should the elements enter the housing between the curtain shade roller and the flange 9, that the elements cannot pass downwardly into the body of the car since the curtain closes the housing relative to the car body.

To permit of the rear side curtains 34 being employed, the rear rails may be provided with fasteners 35 of a conventional form. It is also possible to provide the front rails with similar fastening means should it be desired to use flaps between the front rails and the windshields of the automobile body, and in some instances it may be desirable to detachably connect the flap 24 to the housing 1 instead of permanently fastening the same. It is to be understood that my invention includes these changes and such others as fall within the scope of the appended claims.

What I claim is:—

1. A side curtain construction for an automobile top, comprising a housing adapted to extend longitudinally of the top and have its ends detachably connected to the top bows so as to be bodily removed, flanges carried by said housing, a rollable curtain in said housing and extending from a rear bow to the forwardmost bow of the top, front and rear rails connected to one of said housing flanges, and an intermediate rail connected to both housing flanges said rails providing guides for said curtain.

2. A side curtain construction as characterized in claim 1, wherein all of said rails are composed of telescopic sections and pivotally connected to the housing flanges to fold in the direction of said housing.

In testimony whereof I affix my signature in the presence of two witnesses.

SYLVESTER A. GATES.

Witnesses:
ANNA M. DORR,
H. C. UNDERWOOD.